United States Patent [19]

Guidoux et al.

[11] 4,165,488

[45] Aug. 21, 1979

[54] DERANGEMENT DETECTOR IN A RECEIVER OF A SYSTEM FOR DATA TRANSMISSION BY MEANS OF PHASE MODULATION OF A CARRIER

[75] Inventors: Loic B. Y. Guidoux; Jean-Louis Renaudat, both of Le Plessis-Robinson, France

[73] Assignee: Telecommunications Radioelectriques et Telephoniques T.R.T., Paris, France

[21] Appl. No.: 834,957

[22] Filed: Sep. 20, 1977

[30] Foreign Application Priority Data

Sep. 30, 1976 [FR] France ................................ 76 29359

[51] Int. Cl.$^2$ ........................ H04B 1/16; H04L 27/24; H04L 27/22

[52] U.S. Cl. ........................................ 325/321; 178/67

[58] Field of Search .................. 325/320, 321; 178/88, 178/67

[56] References Cited

U.S. PATENT DOCUMENTS

| | | | |
|---|---|---|---|
| 3,747,024 | 7/1973 | Choquet et al. ........................ | 178/67 |
| 4,076,956 | 2/1978 | Dogliotti et al. ........................ | 178/67 |

*Primary Examiner*—Robert L. Griffin
*Assistant Examiner*—Joseph A. Orsino, Jr.

*Attorney, Agent, or Firm*—Thomas A. Briody; William J. Streeter; Henry I. Steckler

[57] ABSTRACT

A receiver of a system for data transmission by means of p-phase modulation comprises a digital phase discriminator with a calculating unit which calculates in a first interval of each sampling period the in-phase and quadrature components of a signal derived from a passband signal at sampling instant jT by a phase rotation over an angle equal and opposite to the phase of a reference carrier at instant (j−1)T.

A simple derangement detector is obtained by means of a sign detector for a component supplied by the calculating unit during a second interval of each sampling period, the phase of the reference carrier then having been subjected to a phase rotation equal to the phase variation of the transmitted carrier, and by means of a calculated circuit which calculates the quantity $|\bar{x}_3| - kx_3$, where $k < \tan(\pi/p)$ and $x_3$, $\bar{x}_3$ are the in-phase and quadrature components supplied by the calculating unit during a third interval of each sampling period, the phase of the reference carrier then having been subjected to an additional phase rotation equal to $+(\pi/p)$ or $-(\pi/p)$ depending on the sign determined by the sign detector. Alarm pulses are supplied at a negative sign of the quantity calculated by the calculating circuit.

4 Claims, 4 Drawing Figures

DERANGEMENT DETECTOR IN A RECEIVER OF A SYSTEM FOR DATA TRANSMISSION BY MEANS OF PHASE MODULATION OF A CARRIER

The invention relates to a derangement detector in a receiver of a system for data transmission by means of n-phase modulation of a carrier, the receiver comprising a phase discriminator with a calculating unit arranged for receiving digital signals whose associated signal samples occur at a rate equal to the data modulation rate, said digital signals being representative of the in-phase and quadrature components of the passband signal at each sampling instant and of the in-phase and quadrature component of a reference carrier at the preceding sampling instant, said calculating unit comprising means for calculating during a first interval of each sampling period samples $x_1$ and $\bar{x}_1$ of signals representative of the in-phase and quadrature components of a signal derived from the passband signal by a phase rotation over an angle equal and opposite to the phase of the reference carrier at the preceding sampling instant, the phase discriminator reproducing the transmitted phase jumps from said signal samples $x_1$ and $\bar{x}_1$, said phase discriminator further comprising means for increasing during a second interval of each sampling period the phase of the reference carrier by a first additional phase equal to the phase variation of the transmitted carrier corresponding to the phase jump reproduced during said first interval.

A receiver with a phase discriminator of the above-mentioned type is disclosed in French Patent Application No. 75.39.962 filed on Dec. 29, 1975 which corresponds to U.S. application Ser. No. 753,270, filed Dec. 22, 1976, now abandoned.

During the data transmission deficiencies may occur in the transmission path up to the phase discriminator or in the phase discriminator itself which effect a derangement of the receiver resulting in an impermissible number of errors in the reproduced data signals. This derangement may be of a temporary nature but may, on the other hand, subsist after the disappearance of the deficiencies causing it. A permanent derangement, called synchronization loss, may be due to a loss of phaselock of the reference carrier for the phase discriminator and/or a misadjustment of a passband equalizer preceding the phase discriminator. In all cases a rapid derangement indication in the receiver is important, inter alia for starting an automatic procedure in the case of a permanent derangement for recovering the synchronization, It is an object of the invention to provide a simple and reliable derangement detector in a receiver of the type mentioned in the preamble.

The derangement detector in accordance with the invention is characterized in that the derangement detector comprises (a) a circuit for detecting the sign of one of the signal samples $x_2$ and $\bar{x}_2$ supplied by the calculating unit during said second interval, (b) means for increasing during a third interval of each sampling period the phase of the reference carrier by said first additional phase and also by a second additional phase whose magnitude is equal to $\pi/p$ and whose sign if opposite to the sign detected by said sign detection circuit, (c) a calculating circuit for producing a quantity $|\bar{x}_3| - kx_3$ from the signal samples $x_3$ and $\bar{x}_3$ supplied by the calculating unit during said third interval, where k is a predetermined positive coefficient having a value smaller than $\tan(\pi/n)$, (d) a circuit for supplying alarm pulses at a negative sign of said quantity $|\bar{x}_3| - kx_3$.

To prevent isolated alarm pulses from resulting in a derangement indication it is advantageous that the derangement detector further comprises an alarm pulse smoothing circuit for supplying a derangement indication signal on attaining a predetermined configuration of a series of alarm pulses. In practice, for this configuration a series having a given number of successive alarm pulses is chosen in which series all intervals between two successive alarm pulses are smaller than a given time duration.

Embodiments of the invention and their advantages will now be further explained with reference to the drawings.

Figure 1:
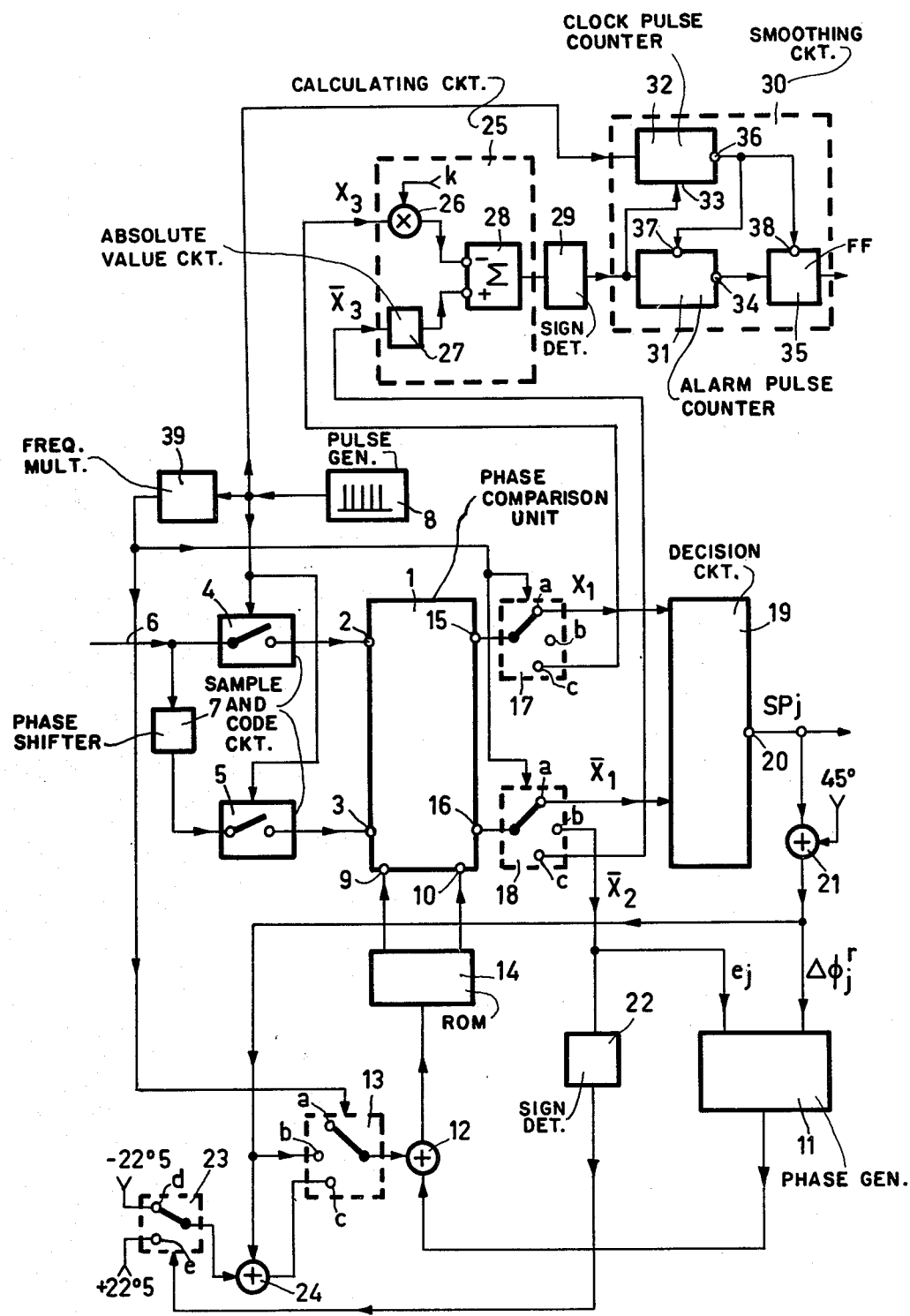
FIG. 1 is a diagram of a derangement detector in accordance with the invention.

The derangement detector shown in FIG. 1 is part of a receiver in a system for data transmission by means of phase modulation. This receiver comprises a phase discriminator of the type described in said U.S. patent application Ser. No. 753,270, filed on Dec. 22, 1976. This phase discriminator comprises a phase comparison unit 1 which receives at a first pair of inputs 2 and 3 samples of digital signals representative of the in-phase and quadrature components of the passband signal and obtained in digital form at the outputs of the sampling-and-coding circuits 4 and 5, respectively. Circuit 4 receives directly the passband signal present at a transmission line 6 and circuit 5 receives this passband signal through a phase shifting network 7 effecting a 90° phase shift. The sampling rate 1/T in circuits 4 and 5 is determined by a sampling pulse generator 8, T being the sampling period; this sampling rate is equal to the modulation rate of the passband signal. The passband signal can be presented in equalized or non-equalized form depending on the presence or absence of a passband equalizer preceding the phase discriminator.

Furthermore, phase comparison unit 1 receives at its second pair of inputs 9 and 10 samples of digital signals representative of the in-phase and in-quadrature components of a reference carrier. In the example of FIG. 1 this reference carrier is generated in the receiver and phase-stabilized on the received carrier. The phase of the reference carrier is supplied in digital form by a phase generator 11, which, as described in the above-mentioned Patent Application is stabilized on the phase of the received carrier by means of the signals $\Delta\phi_j'$ and $e_j$, which will be described in greater detail hereinafter. Phase generator 11 is connected to an address input of a ROM-store 14 through an input and the output of an adder 12, whose other input is connected to the common contact of a switching circuit 13. This switching circuit 13 is controlled such that in each sampling period the positions a, b, and c are successively occupied during a first, a second and a third interval. This control is effected by means of a control signal supplied by a circuit 39, in which the frequency of the sampling pulses of pulse generator 8 is multiplied by three. If it is now assumed that switching circuit 13 is in the position a (first interval) not a single signal arrives at the other input of adder 12, so that in this situation the numbers corresponding to the phase of the reference carrier and supplied by the phase generator 11 are applied as such to the address input of ROM-store 14 to derive therefrom at a sampling rate 1/T the corresponding in-phase and in-quadrature components of the reference carrier.

During the first interval of each sampling period phase comparison unit 1 supplies at its outputs 15 and 16 the samples $x_1$ and $\bar{x}_1$ of signals representative of the in-phase and quadrature components of a signal derived from the passband signal at a sampling instant jT by a phase shift over an angle equal and opposite to the phase of the reference carrier at the preceding sampling instant (j−1)T. These signal samples $x_1$ and $\bar{x}_1$ are supplied to the common contact of switching circuits 17 and 18 which, just like switching circuit 13, have three positions a, b and c and which are controlled in the same manner. During the first interval of each sampling period, in which switching circuits 17 and 18 are in the position a, the signal samples $x_1$ and $\bar{x}_1$ are applied to the inputs of a decision circuit 19 which, as described in said U.S. patent application Ser. No. 753,270, reproduces at its output 20 at each sampling instant jT the transmitted phase jumps $SP_j$ corresponding to the data signals. In addition, during each sampling period T, the phase variations $\Delta\phi_j'$ of the transmitted carrier modulated by the phase jumps are obtained at the output of an adder 21 forming the sum of the phase jumps $SP_j$ and a constant quantity equal to the phase variation of the unmodulated transmitted carrier during each sampling period T. The phase variations $\Delta\phi_j'$ are specially used for controlling phase generator 11.

In the example, frequently used hereinafter, of a 4800 bit/s modem transmitting the data signals by means of eight-phase modulation, the modulation rate amounts to 1600 Baud, so that the sampling period T amounts to 1/1600 sec. The transmitted phase jumps $SP_j$ have eight possible values which are multiples of 45° from 0° to 315°. The carrier has a frequency of 1800 Hz, so that during each sampling period T=1/1600 sec. the constant phase variation of the unmodulated carrier amounts to 45°. In this example this 45° phase variation is added by means of adder 21 to the phase jumps $ST_j$ for forming the phase variation $\Delta\phi_j'$ of the modulated transmitted carrier.

During the second interval of each sampling period adder 12 always receives at one input the phase $\phi_{j-1}^r$ of the reference carrier at the instant (j−1)T which is supplied by phase generator 11. At the other input adder 12 receives through switching circuit 13, which is now in the position b, a first additional phase equal to the phase variation $\Delta\phi_j'$ derived from the phase jumps $SP_j$ by means of adder 21. In this manner phase comparison unit 1 receives during the second interval at its inputs 9, 10 the components of the reference carrier which has been subjected to this additional phase shift and then supplies signal samples $x_2$ and $\bar{x}_2$ at its outputs 15 and 16. As described in the above-mentioned patent application one of these signal samples $\bar{x}_2$ can be used as phase error signal $e_j$ which, together with the phase variation $\Delta\phi_j'$, controls phase generator 11. To this end output 16 of phase comparison unit 1 is connected in FIG. 1 to an input $e_j$ of generator 11 through switching circuit 18 in the position b.

In the derangement detector in accordance with the invention the signal sample $\bar{x}_2$ supplied by phase comparison unit 1 during the second interval of each sampling period is furthermore applied to a sign detection circuit 22 through switching circuit 18 in the position b. Depending on whether the sign of $\bar{x}_2$ is positive or negative this sign detection circuit 22 moves a two-position switching circuit 23 to the position d or to the position e.

During the third interval of each sampling period, which interval is only intended for the derangement detector, one input of adder 12 receives the phase $\phi_{j-1}^r$ of the reference carrier and the other input of adder 12 receives through switching circuit 13 in the position c the sum, formed in an adder 24, of the first additional phase $\Delta\phi_j'$ and a second additional phase equal to $-(\pi/n)$ or $+(\pi/n)$, thus in the case of eight-phase modulation: −22°5 or +22°5, depending on whether switching circuit 23 is in the position d or in the position e.

During the third inteval of each sampling period phase comparison unit 1 receives at its inputs 9 and 10 the components of the reference carrier which has been subjected to the phase rotation $\Delta\phi_j' - \pi/n$ or $\Delta\phi_j' + \pi/n$ and supplies at its outputs 15 and 16 the signal samples $x_3$ and $\bar{x}_3$ which are applied through switching circuits 17 and 18 in the position c to a calculating circuit 25, which is provided with a multiplier 26 forming the product $kx_3$, with a circuit 27 forming the absolute value $|\bar{x}_3|$ of $\bar{x}_3$, and with a circuit 28 forming the difference $|\bar{x}_3| - kx_3$, where k is a predetermined positive coefficient having a value smaller than $\tan(\pi/n)$.

The output of calculating circuit 25 is connected to a circuit 29 which supplies alarm pulses if the quantity $|\bar{x}_3| - kx_3$ has a negative sign.

The output of circuit 29 is connected to a smoothing circuit 30 for the alarm pulses. In the embodiment of FIG. 1 this circuit 30 comprises an alarm pulse counter 31 and a clock pulse counter 32 for counting the pulses of sampling pulse generator 8. The alarm pulses are also applied to a reset input 33 of clock pulse counter 32. If alarm pulse counter 31 attains a predetermined position its output 34 supplies a set signal for a bistable trigger 35 which then supplies a derangement indication signal. If clock pulse counter 32 attains a predetermined position its output 36 supplies a signal which is applied to a reset input 37 of alarm pulse counter 31 and to a reset input 38 of bistable trigger 35.

The operation of the derangement detector just described will be further explained with reference to the diagrams of FIG. 2, FIG. 3, and FIG. 4.

Figure 2:
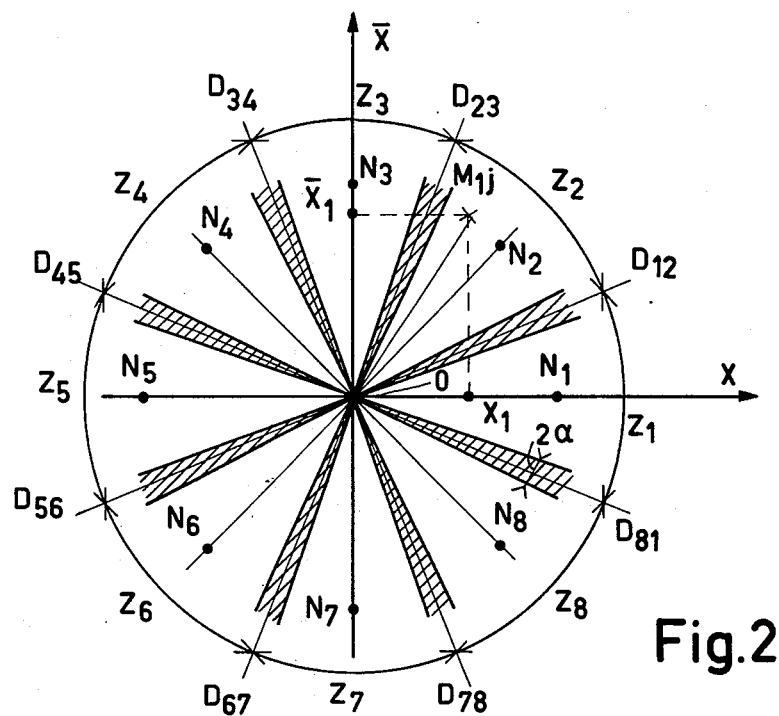
FIG. 2, FIG. 3 and FIG. 4 show phase diagrams for explaining the processings performed in the derangement detector of FIG. 1 during the first, second and third intervals of each sampling period.

The diagram of FIG. 2 illustrates the operation of the actual phase discriminator during the first interval of each sampling period. In this diagram, in a rectangular coordinate system Ox, $O\bar{x}$, a point $M_{1j}$ is shown which is an image of the signal supplied by phase comparison unit 1 during the first interval of each sampling period. As coordinates this point $m_{1j}$ has the signal samples $x_1$ and $\bar{x}_1$ supplied by phase comparison unit 1. As explained in the above-mentioned patent application for the case that Ox is the phase reference axis, the phase of the signal represented by the point $M_{1j}$ is equal to the phase variation $\Delta\phi_j'$ of the received carrier between the sampling instants (j−1)T and jT.

By starting from the assumption that the data signals are transmitted by eight-phase modulation with the aid of the 4800 bit/s modem having the above-described characteristics, the transmitted modulated carrier is subjected between the sampling instants (j−1)T and jT to one of the eight phase variations $\Delta\phi_j'$ which are multiples of 45° from 0° to 315°. In the diagram of FIG. 2 the transmitted signals, subjected to these eight phase variations $\Delta\phi_j'$, are represented by the points $N_1, \ldots, N_8$ having phases $\Delta\phi_j'$.

The diagram of FIG. 2 also shows the half-lines $OD_{12}, \ldots, OD_{81}$ dividing the plane into eight decision zones of 45°, which are each divided in their turn into two equal portions by the half-lines $ON_1, \ldots, ON_8$. Depending on the signal samples $x_1, \bar{x}_1$ received during the first interval of each sampling period, decision circuit 19 determines to which of the zones $Z_1, \ldots, Z_8$ a point $M_{1j}$ belongs and derives therefrom that the phase variation of the transmitted carrier is the phase multiple of 45° of one of the points $N_1, \ldots, N_8$.

The derangement detector according to the invention is based on the fact that during the derangement, due to a deficiency in the transmission path up to the phase discriminator or in the phase discriminator itself, a given number of the above-defined points $M_{1J}$ are located in so-called alarm zones near the half-lines $OD_{12}, \ldots, OD_{81}$ limiting the decision zones. In FIG. 2 these eight alarm zones are represented by the hatched angular sections $2\alpha$, which are centred on the half-lines $OD_{12}, \ldots, OD_{81}$. It is clear that in practice the angle $\alpha$ defining the range of each alarm zones is chosen considerably smaller than 22°5 in the described example, and $\pi/p$ in the general case.

The invention provides simple means for detecting whether the points $M_{1J}$ are within one of the eight alarm zones. These means are used during the second and third interval of each sampling period.

Figure 3:
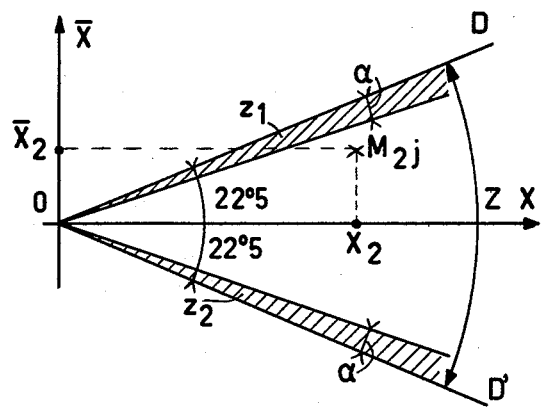

As shown in the above-mentioned patent application, it is possible, when during the second interval of each sampling period the phase of the reference carrier is increased by $\Delta\phi_j'$, to represent the image of the signal samples $x_2, \bar{x}_2$ obtained at the output 15, 16 of phase comparison unit 1 in accordance with the diagram of FIG. 3 by a point $M_{2j}$ invariably located in one single zone Z limited by half-lines OD and OD' at an angle of +22°5 and −22°5, respectively, to Ox. In FIG. 3 the eight alarm zones of FIG. 2 are transformed into one alarm zone formed by two half alarm zones. These half alarm zones are the hatched sectors $z_1$ and $z_2$ having an angle $\alpha$ which are situated within the angular zone Z and are limited at one side by the half-lines OD and OD', respectively.

During the second interval of each sampling period circuit 22 detects the sign of the signal sample $\bar{x}_2$. Detecting a positive sign indicates that the point $M_{2j}$ is in the sector limited by Ox and OD, OD being at an angle of +22°5 to Ox; in this case switching circuit 23 is set to the position d. Detecting a negative sign indicates that the point $M_{2j}$ is in the sector limited by Ox and OD', OD' being at an angle of −22°5 to OX; in this case switching circuit 23 is set to the position e.

During the third interval of each sampling period the phase of the reference carrier is increased by the phase variation $\Delta\phi_j'$ (as in the second interval) and also by −22°5 or +22°5, depending on whether switching circuit 23 is in the position d or e. It appears from the preceding explanation that, depending on whether a point $M_{2j}$ in FIG. 3 is in the sector Ox. OD or in the sector Ox.OD', this point $M_{2j}$ is transformed into one point $M_{3j}$ which is shown in the diagram of FIG. 4 and which is derived from $M_{2j}$ by a phase shift over −22°5 or +25°5. The coordinates of the point $M_{3j}$ are values of the signal samples $x_3$ and $\bar{x}_3$ which are supplied by phase comparison unit 1 during the third interval of each sampling period. It is easy to see that the two half-lines OD and OD' in FIG. 3 are transformed in the diagram of FIG. 4 into the axis Ox and that the two half-zones $z_1$ and $z_2$ are transformed into two sectors $z'_1$ and $z'_2$ which together form one single alarm zone z having an angle $2\alpha$ and being centered at Ox.

Figure 4:
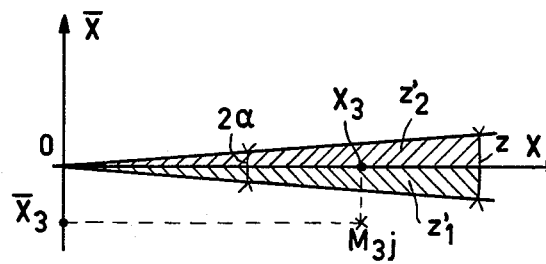

After the various phase rotation operations on the reference carrier during the second and third interval of each sampling period the comparatively intricate problem of detecting to which alarm zones the points in FIG. 2 belong is finally replaced by the simple problem of detecting whether the points $M_{3j}$ in FIG. 4 belong to the single alarm zone z. It is easy to see that if point $M_{3j}$ belongs to the alarm zone z the quantity $|\bar{x}_3| - \tan \alpha . x_3$ is negative, $x_3$ and $\bar{x}_3$ being the coordinates of the point $M_{3j}$. This criterion is utilized in the derangement detector shown in FIG. 1 by means of calculating circuit 25 which receives the signal samples $x_3$ and $\bar{x}_3$ supplied by phase comparison unit 1 during the third interval of each sampling period and which calculates the quantity $|\bar{x}_3| - kx_3$, where $k = \tan \alpha$, and by means of circuit 29 supplying an alarm pulse each time this quantity is negative.

The derangement detector described so far is restricted to producing alarm pulses and can be used to determine whether the transmission system is or is not near the ideal operating condition. However, in view of the definition of the alarm zone it is clear that an isolated alarm pulse during the data transmission does not indicate a derangement situation. An actual derangement manifests itself by exceeding a given density of the alarm pulses and it is consequently advantageous to pass the alarm pulses on to a smoothing circuit supplying a derangement indication signal when a given configuration of a series of alarm pulses is attained.

FIG. 1 shows, for example, a smoothing circuit 30 arranged for supplying an interference signal when receiving a series with a given number of alarm pulses, where all intervals between two successive alarm pulses are shorter than a given period of time. The operation of this smoothing circuit 30 is namely as follows. Alarm pulse counter 31, which was initially in its zero position, causes the bistable trigger 35 to change state if, for example, N=64 alarm pulses have been counted. Clock pulse counter 32 counts the pulses of generator 8 occurring at the rate 1/T=1600 Hz in the described example. This clock pulse counter 32 is reset to its zero position at each alarm pulse and if a given position for example, corresponding to M=128 counted pulses is attained, clock pulse counter 32 resets alarm pulse counter 31 and bistable trigger 35 to their zero position. From this it follows that bistable trigger 35 only changes state for supplying a derangement indication signal if N=64 successive alarm pulses have been counted by alarm pulse counter 31 and if the interval between two successive alarm pulses is always smaller than MT=128/1600 sec. As soon as this interval MT has been attained the derangement indication signal disappears and alarm pulse counter 31 is reset to its zero position.

In the preceding description the derangement detector is combined with a phase discriminator utilizing the phase of a local reference carrier produced by means of generator 11. As was shown in the above-mentioned patent application, a phase discriminator of the same type can be realized in which, however, the received passband signal delayed over a sampling period T is used as reference carrier. It is easy to see that the present derangement detector is also suitable for being combined with such a phase discriminator.

The described derangement detector can also be used in a data transmission system utilizing a combination of phase modulation and amplitude modulation. A disturbance in the transmission path usually manifests itself by irregularities of the carrier phase which the present derangement detector can detect.

What is claimed is:

1. A derangement detector in a receiver of a system for data transmission by means of n-phase modulation of a carrier, the receiver comprising a phase discriminator including a calculating unit having input means for receiving digital signals having signal samples occurring at a rate equal to the data symbol rate, said digital signals being representative of the in-phase and quadrature components of a received passband signal at each sampling instant and of the in-phase and quadrature components of a reference carrier at the preceding sampling instant, said calculating unit comprising means for calculating during a first interval of each period samples $x_1$ and $\bar{x}_1$ of signals representative of the in-phase and quadrature components of a signal derived from the passband signal by a phase rotation over an angle equal and opposite to the phase of the reference carrier at the preceding sampling instant, the phase discriminator reproducing the transmitted phase jumps from said signal samples $x_1$ and $\bar{x}_1$, said phase discriminator further comprising means for increasing during a second interval of each sampling period the phase of the reference carrier by a first additional phase equal to the phase variation of the transmitted carrier corresponding to the phase jump reproduced during said first interval, the derangement detector further comprising (a) a circuit means coupled to said calculating unit for detecting the sign of one of the signal samples $x_2$ and $\bar{x}_2$ supplied by the calculating unit during said second interval, (b) means coupled to said calculating unit for increasing during a third interval of each sampling period the phase of the reference carrier by said first additional phase and also by a second additional phase whose magnitude is equal to $\pi/n$ and whose sign is opposite to the sign detected by said sign detection circuit, (c) a calculating circuit means coupled to said calculating unit for producing a quantity $|\bar{x}_3| - kx_3$ from the signal samples $x_3$ and $\bar{x}_3$ supplied by the calculating unit during said third interval, where k is a predetermined positive coefficient having a value smaller than tan $(\pi/p)$, and (d) a circuit means coupled to said calculating circuit for supplying alarm pulses at a negative sign of said quantity $|\bar{x}_3| - kx_3$.

2. A derangement detector as claimed in claim 1, further comprising an alarm pulse smoothing circuit means coupled to said alarm pulse supplying circuit for supplying a derangement indication signal on attaining a predetermined configuration of a series of alarm pulses.

3. A derangement detector as claimed in claim 2, wherein the smoothing circuit comprises means for supplying a derangement indication signal at the occurrence of a predetermined number of alarm pulses, all intervals between two successive alarm pulses being smaller than a given period of time.

4. A derangement detector as claimed in claim 3, wherein said supplying means comprises an alarm pulse counter means coupled to said alarm pulse supplying circuit for supplying a set signal to a bistable trigger to produce the derangement indication signal after a given number of countered alarm pulses, and a clock pulse counter means coupled to said alarm pulse supplying circuit being resettable to its zero position by the alarm pulse for supplying a reset signal to the alarm pulse counter and to the bistable trigger after a given number of counted clock pulses.

* * * * *

UNITED STATES PATENT OFFICE
CERTIFICATE OF CORRECTION

Patent No. 4,165,488   Dated August 21, 1979

Inventor(s) Loic B.Y. Guidoux et al

It is certified that error appears in the above-identified patent and that said Letters Patent are hereby corrected as shown below:

Col. 8, line 10, Before "supplied" change " $x_3$ " (second occurrence) to -- $\overline{x}_3$ --

*Signed and Sealed this*

*Seventeenth* Day of *February 1981*

[SEAL]

*Attest:*

*Attesting Officer*

RENE D. TEGTMEYER

*Acting Commissioner of Patents and Trademarks*